United States Patent
Cho et al.

(10) Patent No.: US 11,603,021 B2
(45) Date of Patent: Mar. 14, 2023

(54) SEAT FRAME ASSEMBLY AND METHOD OF MANUFACTURING SAME

(71) Applicant: Daechang Seat Co., LTD—Dongtan, Hwaseong-si (KR)

(72) Inventors: Chan Ki Cho, Gwangju (KR); Hyun Chul Woo, Bucheon-si (KR); Kyoung Min Cho, Hwaseong-si (KR); Hun Yeong Jun, Hwaseong-si (KR)

(73) Assignee: Daechang Seat Co., Ltd—Dongtan, Hwaseong-si (KR)

( * ) Notice: Subject to any disclaimer, the term of this patent is extended or adjusted under 35 U.S.C. 154(b) by 431 days.

(21) Appl. No.: 16/624,510

(22) PCT Filed: Dec. 26, 2018

(86) PCT No.: PCT/KR2018/016646
§ 371 (c)(1),
(2) Date: Dec. 19, 2019

(87) PCT Pub. No.: WO2020/122306
PCT Pub. Date: Jun. 18, 2020

(65) Prior Publication Data
US 2021/0138944 A1   May 13, 2021

(30) Foreign Application Priority Data

Dec. 12, 2018   (KR) .................... 10-2018-0159697

(51) Int. Cl.
*B60N 2/68* (2006.01)
*B29C 45/14* (2006.01)
(Continued)

(52) U.S. Cl.
CPC .............. *B60N 2/682* (2013.01); *B29C 45/14* (2013.01); *B29C 2045/14245* (2013.01); *B29L 2031/3055* (2013.01); *B29L 2031/771* (2013.01)

(58) Field of Classification Search
CPC ................ B29C 45/14; B29C 45/1418; B29C 2045/14245; B29C 45/14336;
(Continued)

(56) References Cited

U.S. PATENT DOCUMENTS 5,672,549 A * 9/1997 Minami .................. B29C 45/00
438/126
9,090,190 B2 * 7/2015 Yasui ................ B29C 45/14311
(Continued)

FOREIGN PATENT DOCUMENTS

DE   102014016761 A1 * 5/2016
DE   102018202473 A1 * 8/2019 ....... B29C 45/14065
(Continued)

OTHER PUBLICATIONS

Description Translation for KR 10-2018-0079941 from Espacenet (Year: 2018).*
(Continued)

*Primary Examiner* — Karen Beck
*Assistant Examiner* — Daniel M. Keck
(74) *Attorney, Agent, or Firm* — Bret E. Field; Bozicevic, Field & Francis LLP (57) ABSTRACT

Disclosed are a seat frame assembly and a method of manufacturing the same whereby adhesion of a reinforcing material attached to a seat frame is improved to secure rigidity of the seat frame and process speed is improved. According to one embodiment disclosed herein, seat frame assembly includes: a frame configured such that a portion of each of opposite sides is bent forward, and supporting an (Continued)

upper body of an occupant; and side members joined to the opposite sides of the frame, respectively, each of the side members including a groove formed in a surface being in close contact with the frame, wherein a portion of the frame that is surface-joined to each of the side members is provided with a protrusion inserted into the groove.

3 Claims, 8 Drawing Sheets

(51) Int. Cl.
   *B29C 51/18* (2006.01)
   *B29C 51/30* (2006.01)
   *B29L 31/30* (2006.01)
   *B29L 31/00* (2006.01)

(58) Field of Classification Search
   CPC ........ B29C 45/14377; B29C 45/14467; B29C 45/14631; B29C 51/18; B29C 51/30; B29L 2031/3055; B29L 2031/771; B60N 2/986; B60N 2/68; B60N 2/682; B60N 2/686
   See application file for complete search history.

(56) References Cited

U.S. PATENT DOCUMENTS

| | | | |
|---|---|---|---|
| 11,034,067 B2* | 6/2021 | Lee | B60N 2/686 |
| 2017/0197533 A1* | 7/2017 | Schlitt | B60N 2/20 |

FOREIGN PATENT DOCUMENTS

| | | |
|---|---|---|
| JP | 6217548 B2 | 10/2017 |
| KR | 10-2012-0107629 A | 10/2012 |
| KR | 10-1278898 B1 | 6/2013 |
| KR | 10-1652718 B1 | 9/2016 |
| KR | 10-2017-0056779 A | 5/2017 |
| KR | 10-2018-0079941 A | 7/2018 |
| KR | 10-1894130 B1 | 10/2018 |

OTHER PUBLICATIONS

Description Translation for DE 102018202473 from Espacenet (Year: 2022).*
Request for the Submission of an Opinion for Korean Application No. 10-2018-0159697 dated Feb. 10, 2020, with its English translation, 9 pages.
Written Decision of Registration for Korean Application No. 10-2018-0159697 dated Jun. 9, 2020, with its English translation, 2 pages.

* cited by examiner

SEAT FRAME ASSEMBLY AND METHOD OF MANUFACTURING SAME

CROSS-REFERENCE TO RELATED APPLICATION

This Application is a Section 371 National Stage Application of International Application No. PCT/KR2018/016646, filed Dec. 26, 2018, the contents of which is hereby incorporated by reference in its entirety.

TECHNICAL FIELD

Disclosed herein is a seat frame assembly and, more particularly, a seat frame assembly for use in a seat of a vehicle and a method of manufacturing the same.

BACKGROUND ART

Unless otherwise indicated herein, the descriptions set forth in this identification are not the related art to the claims of this application and are not to be recognized as the related art as described herein.

A seat frame of a vehicle, which is connected to a seat cushion supporting the lower body of an occupant, supports the back of the occupant and provides protection to the occupant against an accident. For this reason, seat frames require a shock absorption function while maintaining a certain strength.

Conventionally, in order to secure rigidity, seat frames are manufactured by compression molding a reinforcing material including glass mat thermoplastics (GMT), short fiber reinforced thermoplastics (SFT), continuous fiber-reinforced thermoplastic composites (CFT), or long fiber reinforced thermoplastics (LFT). In this case, while the rigidity is secured, there is a disadvantage in that an adhesion problem of the reinforcing material to the seat frames may arise.

Therefore, there is a need for a technique in which while securing the rigidity of a seat frame by use of a reinforcing material attached to the seat frame, a composite material firmly maintains an adhesive state of the reinforcing material with the seat frame through deformation due to application of external impacts.

One example of this technique is disclosed in Korean Patent No. 10-1894130, entitled "CFT pre-forming insert injection molded seat back frame". Another example is disclosed in Korean Patent No. 10-1652718, entitled "Front seat back frame using complex material applied continuous fiber"

However, these techniques in the related art do not provide a method for improving adhesion of a seat frame and of a reinforcing material attached to the seat frame.

DISCLOSURE

Technical Problem

Accordingly, the present invention has been made keeping in mind the above problem occurring in the related art, and an objective of the present invention is to provide a seat frame assembly and a method of manufacturing the same whereby adhesion of a reinforcing material attached to a seat frame is improved to secure rigidity of the seat frame and process speed is improved.

The objectives of the present invention are not limited to the above-mentioned objectives, and further objectives will be derived from the following description.

Technical Solution

In order to accomplish the above objective, according to one aspect disclosed herein, there is provided a seat frame assembly, including: a frame configured such that a portion of each of opposite sides is bent forward, and supporting an upper body of an occupant; and side members joined to the opposite sides of the frame, respectively, each of the side members including a groove formed in a surface being in close contact with the frame, wherein a portion of the frame that is surface-joined to each of the side members is provided with a protrusion inserted into the groove.

Furthermore, the groove of each of the side members may be formed in such a manner that a workpiece made of a prepreg may be preheated and then multiple pins formed on any one of upper and lower molds may press the workpiece between the upper and lower molds by lowering of the upper mold.

Furthermore, the frame may include depressed portions depressed toward each other at the opposite sides of the frame, bent portions bent toward the opposite sides of the frame at front edges of the depressed portions, and corner portions bent toward each other at rear edges of the depressed portions, wherein the protrusion protrudes from surfaces of each of the depressed portions, each of the bent portions, and each of the corner portions in a direction perpendicular thereto in a mesh shape.

According to another aspect disclosed herein, there is provided a method of manufacturing a seat frame assembly including a frame and side members joined to opposite sides of the frame, the method including: inserting a first workpiece for forming the frame into a heating unit and heating the first workpiece; press-forming the preheated first workpiece, thus forming a first insert; press-forming second workpieces preheated for forming the side members, thus forming second inserts each of which includes a groove formed in a rear surface thereof; and allowing the rear surface of each of the second inserts to be brought into close contact with each of opposite sides of the first insert and then insert-injection molding the first and second inserts by press forming, thus manufacturing the seat frame assembly.

Furthermore, the groove of each of the second inserts may be formed in such a manner that each of the second workpieces disposed between the upper and lower molds may be pressed by multiple pins formed in any one of the upper and lower molds, thus forming a mesh-shaped groove in the rear surface of the second insert.

Furthermore, in the insert-injection molding of the first and second inserts, a portion of the first insert may be inserted into the groove to form a protrusion.

Advantageous Effects

According to one embodiment disclosed in the present specification, a seat frame assembly is manufactured by joining side members manufactured by forming a composite material made of glass fibers and resin to opposite sides of a frame manufactured by forming prepregs. This provides an advantage of ensuring rigidity of a relatively weak portion.

Furthermore, in the process of manufacturing the seat frame assembly, the side members including a mesh or grid shaped groove and the frame having a seat frame shape are joined by insert-injection molding. This provides an advantage of improving a joining force between the frame and the side members.

Furthermore, when an external force is applied to the seat frame assembly, protrusions of the frame inserted into bent portions formed at the edges of the side members prevent separation of the side members. This provides an advantage of improving durability of the seat frame assembly.

The effects of the present invention are naturally exhibited from the specification of the present invention irrespective of whether the inventors recognize the effects of the present invention. Consequently, the effects of the present invention are some effects of the present invention based on the specification of the present invention, and do not include all effects that the inventors have found or that actually exist.

In addition, the effects of the present invention are further recognized through the specification of the present invention. Although not described clearly, any effects that can be recognized by those skilled in the art to which the present invention pertains from the specification of the present invention may be included in the effects of the present invention.

MODE FOR INVENTION

Hereinafter, the configuration, operation, and effect of a seat frame assembly and a method of manufacturing the same according to exemplary embodiments will be described with reference to the accompanying drawings. For reference, in the figures, each component is omitted or schematically illustrated for convenience and clarity of illustration, and the size of each component does not completely reflect a real size. Further, the same reference numerals are used throughout the different drawings to designate the same or similar components. In the individual drawings, reference numerals for the same components will be omitted.

Figure 1:
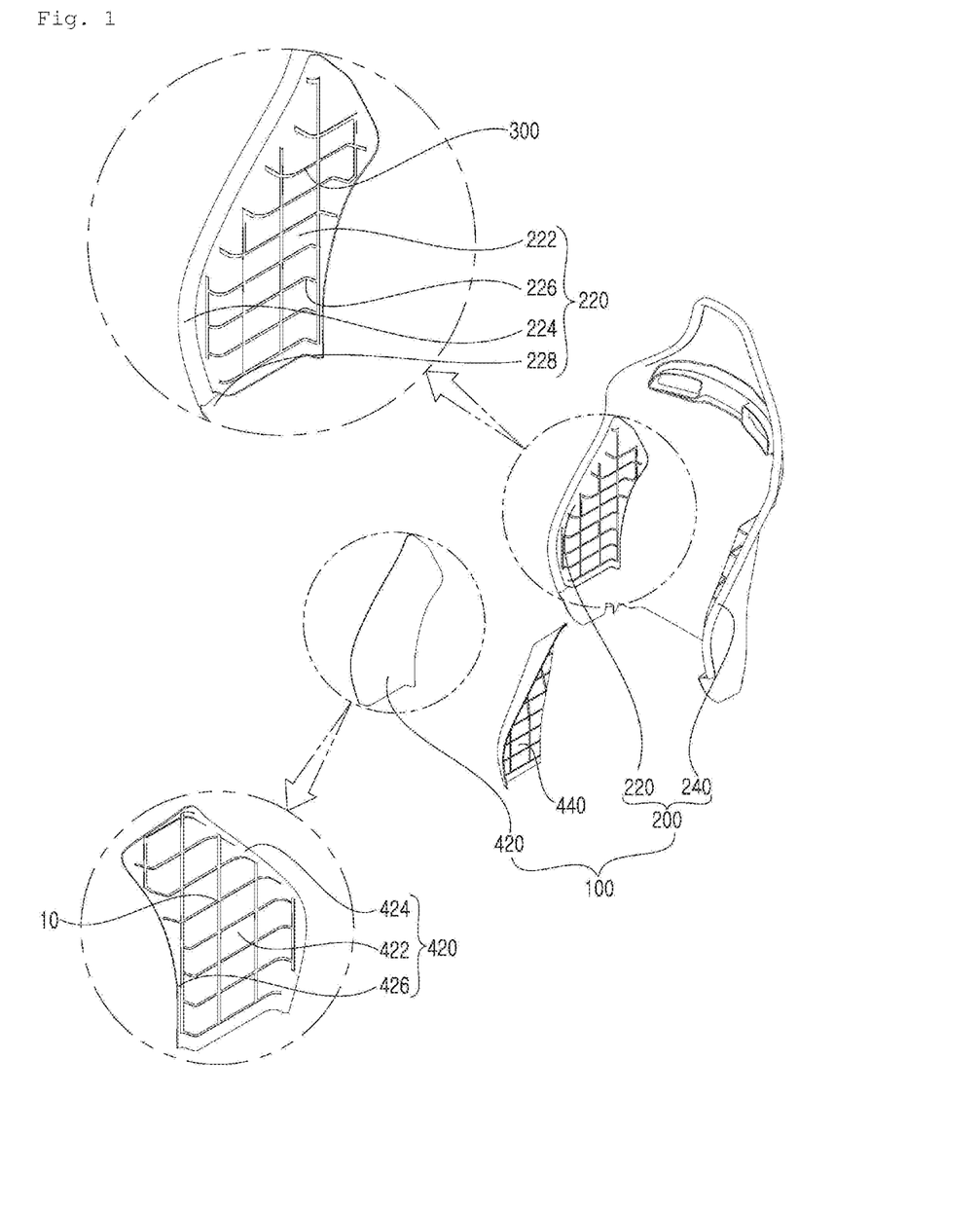
FIGS. 1 and 2 are exploded perspective views showing a seat frame assembly according to an embodiment disclosed herein.
Figure 2:
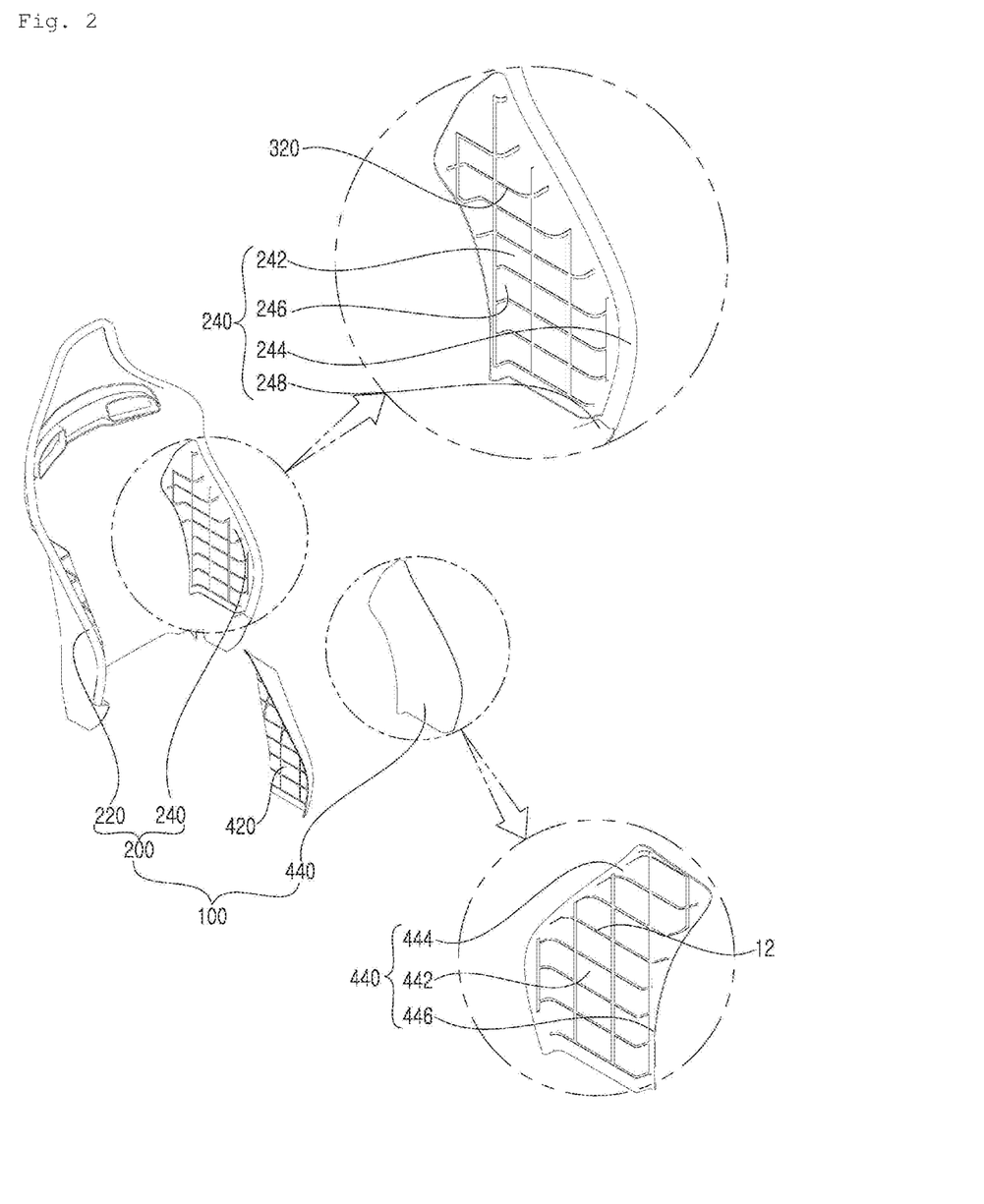

FIGS. 1 and 2 are exploded perspective views showing a seat frame assembly according to an embodiment disclosed herein.

As shown in FIGS. 1 and 2, a seat frame assembly 100 includes a frame 200 and side members 420 and 440.

In the seat frame assembly 100, the side members 420 and 440 are attached to reinforce rigidity of opposite side portions of the seat frame assembly 100 which are relatively vulnerable to external impacts.

The frame 200 includes a first side frame 220 and a second side frame 240.

The frame 200 is formed in a shape surrounding the back and the upper body of an occupant seated on a seat of a vehicle to support the occupant. The frame is configured to be deformed or damaged due to external impacts to protect the occupant thereagainst.

The frame 200 is manufactured by press-forming a plate-shaped prepreg (PA6-GF60%) material formed by joining resin to a fiber reinforced material including long fiber reinforced thermoplastics (LFT) and short fiber reinforced thermoplastics (SFT).

The first side frame 220 is formed in a shape in which a portion of a first side of the frame 200 is bent forward to support one side of the upper body of the occupant. The first side frame serves to protect the occupant against an external force generated from a first side of the occupant.

The first side frame 220 is configured such that a first end is connected at an upper portion to the first side of the frame 200, and a second end is inclinedly extended from the first end toward a lower front to support both sides of the occupant's body seated on a seat cushion.

In detail, the first side frame 220 includes a depressed portion 222, a bent portion 224, a corner portion 226, and a locking step 228.

The depressed portion 222 is formed in a shape in which a portion of a central portion defined between the first and second ends of the first side frame 220 is depressed by a predetermined distance toward the occupant. The depressed portion 222 includes an inner surface provided with a protrusion 300 protruding toward the occupant in a mesh shape.

The bent portion 224 is formed at a position corresponding to a front of the depressed portion 222 in a shape in which a portion of the depressed portion 222 is bent and extended toward the first side of the frame 200 and then is bent forward. The bent portion 224 includes a lower portion provided with the locking step 228.

The corner portion 226 is formed in a shape in which a portion of a rear edge of the depressed portion 222 is bent and extended toward the second side of the frame 200 and then is bent rearward and connected to the frame 200 to protrude forward of the frame 200.

The bent portion 224 includes an inner surface provided with a portion of the protrusion 300 having a mesh shape, the portion being connected to the protrusion 300 formed at the depressed portion 222. The corner portion 226 includes an inner surface provided with a portion of the protrusion 300 having a mesh shape, the portion being connected to the protrusion 300 formed at the depressed portion 222.

Thus, the protrusion 300 protrudes from the inner surfaces of the depressed portion 222, the bent portion 224, and the corner portion 226 in a direction perpendicular to the inner surfaces of the depressed portion 222, the bent portion 224, and the corner portion 226, thus being formed in an integral mesh shape that is in close contact with the inner surface of the first side frame 220.

The side member 420 is formed to be surface-joined to the first side frame 220. The side member 420 is manufactured using a reinforcing material including short fiber reinforced thermoplastics (SFT), long fiber reinforced thermoplastics (LFT), and continuous fiber-reinforced thermoplastic composites (CFT) to improve the strength of the first side frame 220.

In detail, the side member 420 includes a body 422, an inclined surface 424, and a boundary 426.

The body 422 includes a flat surface inclinedly extended from a first end toward a lower front and being in close contact with the inner surface of the depressed portion 222, and a mesh-shaped groove 10 into which the protrusion 300 formed in the depressed portion 222 is inserted.

The inclined surface 424 is formed in a shape in which a portion of a front edge of the body 422 is bent toward the first side of the frame 200, and an outer surface of the inclined surface 424 is in close contact with the inner surface of the bent portion 224 of the first side frame 220.

The boundary 426 is formed in a shape in which a portion of a rear edge of the body 422 is bent toward the second side of the frame 200, and an outer surface of the boundary 426 is in close contact with the inner surface of the corner portion 226 of the first side frame 220.

The groove 10 formed in the body 422 is extended toward the inclined surface 424 and the boundary 426 while maintaining a mesh shape, to define a space into which the protrusion 300 formed in the depressed portion 222, the bent portion 224, and the corner portion 226 is inserted.

Thus, in a state in which the side member 420 is joined to the inner surface of the first side frame 220, the protrusion 300 formed in the depressed portion 222 is inserted into the groove 10. This ensures that the side member 420 is prevented from being separated forward, rearward, downward, or upward due to application of external impacts.

Furthermore, in a state in which the side member 420 is joined to the inner surface of the first side frame 220, a lower end of the inclined surface 424 is in close contact with the locking step 228, and a portion of the protrusion 300 formed in the bent portion 224 is inserted into a portion of the groove 10 formed in the inclined surface 424. This ensures that the side member 420 is effectively prevented from being separated toward the second side, upper side, or lower side of the frame 200 due to application of external impacts.

Furthermore, in a state in which the side member 420 is joined to the inner surface of the first side frame 220, a portion of the protrusion 300 formed in the corner portion 226 is inserted into a portion of the groove 10 formed in the boundary 426. This ensures, together with the inclined surface 424, that the side member 420 is prevented from being separated toward the second side, upper side, or lower side of the frame 200 due to application of external impacts.

Furthermore, provision of the protrusion 300 formed in the first side frame 220 ensures that the surface area in which the first side frame 220 and the side member 420 are attached together is increased, thus improving a joining force between the first side frame 220 and the side member 420.

Referring to FIG. 2, the second side frame 240 is formed in a shape in which a portion of the second side of the frame 200 is bent forward to support one side of the upper body of the occupant. The first side frame serves to protect the occupant against an external force generated from a second side of the occupant.

The second side frame 240 is configured such that a first end is connected at an upper portion to the second side of the frame 200, and a second end is inclinedly extended from the first end toward a lower front to support both sides of the occupant's body seated on a seat cushion.

In detail, the second side frame 240 includes a depressed portion 242, a bent portion 244, a corner portion 246, and a locking step 248.

The depressed portion 242 is formed in a shape in which a portion of a central portion defined between the first and second ends of the second side frame 240 is depressed by a predetermined distance toward the occupant.

The depressed portion 242 includes an inner surface provided with a protrusion 320 protruding toward the occupant in a mesh shape.

The bent portion 244 is formed at a position corresponding to a front of the depressed portion 242 in a shape in which a portion of the depressed portion 242 is bent and extended toward the second side of the frame 200 and then is bent forward. The bent portion 244 includes a lower portion provided with the locking step 248.

The corner portion 246 is formed in a shape in which a portion of a rear edge of the depressed portion 242 is bent and extended toward the first side of the frame 200 and then is bent rearward and connected to the frame 200 to protrude forward of the frame 200.

The bent portion 244 includes an inner surface provided with a portion of the protrusion 320 having a mesh or grid-shape, the portion being connected to the protrusion 320 formed at the depressed portion 242. The corner portion 246 includes an inner surface provided with a portion of the protrusion 320 having a mesh or grid-shape, the portion being connected to the protrusion 320 formed at the depressed portion 242.

Thus, the protrusion 320 protrudes from the inner surfaces of the depressed portion 242, the bent portion 244, and the corner portion 246 in a direction perpendicular to the inner surfaces of the depressed portion 242, the bent portion 244, and the corner portion 246, thus being formed in an integral mesh shape that is in close contact with the inner surface of the second side frame 240.

The side member 440 is formed to be surface-joined to the second side frame 240. The side member 440 is manufactured using a reinforcing material including short fiber reinforced thermoplastics (SFT), long fiber reinforced thermoplastics (LFT), and continuous fiber-reinforced thermoplastic composites (CFT) to improve the strength of the second side frame 240.

In detail, the side member 440 includes a body 442, an inclined surface 444, and a boundary 446.

The body 442 includes a flat surface inclinedly extended from a first end toward a lower front and being in close contact with the inner surface of the depressed portion 242, and a mesh-shaped groove 12 into which the protrusion 320 formed in the depressed portion 242 is inserted.

The inclined surface 444 is formed in a shape in which a portion of a front edge of the body 442 is bent toward the second side of the frame 200, and an outer surface of the inclined surface 444 is in close contact with the inner surface of the bent portion 244 of the second side frame 240.

The boundary 446 is formed in a shape in which a portion of a rear edge of the body 442 is bent toward the first side of the frame 200, and an outer surface of the boundary 446 is in close contact with the inner surface of the corner portion 246 of the second side frame 240.

The groove 12 formed in the body 442 is extended toward the inclined surface 444 and the boundary 446 while maintaining a mesh or grid shape, to define a space into which the protrusion 320 formed in the depressed portion 242, the bent portion 244, and the corner portion 246 is inserted.

Thus, in a state in which the side member 440 is joined to the inner surface of the second side frame 240, the protrusion 320 formed in the depressed portion 242 is inserted into the groove 12. This engagement between the protrusion 320 and the groove 12 prevents the side member 440 from being separated forward, rearward, downward, or upward due to application of external impacts.

Furthermore, in a state in which the side member 440 is joined to the inner surface of the second side frame 240, a lower end of the inclined surface 444 is in close contact with the locking step 248, and a portion of the protrusion 320 formed in the bent portion 244 is inserted into a portion of the groove 12 formed in the inclined surface 444. This ensures that the side member 440 is effectively prevented from being separated toward the first side, upper side, or lower side of the frame 200 due to application of external impacts.

Furthermore, in a state in which the side member 440 is joined to the inner surface of the second side frame 240, a portion of the protrusion 320 formed in the corner portion 246 is inserted into a portion of the groove 12 formed in the boundary 446. This ensures, together with the inclined surface 444, that the side member 440 is prevented from being separated toward the first side, upper side, or lower side of the frame 200 due to application of external impacts.

Furthermore, provision of the protrusion 320 formed in the second side frame 240 ensures that the surface area in which the second side frame 240 and the side member 440 are attached together is increased, thus improving a joining force between the second side frame 240 and the side member 420.

Figure 3:
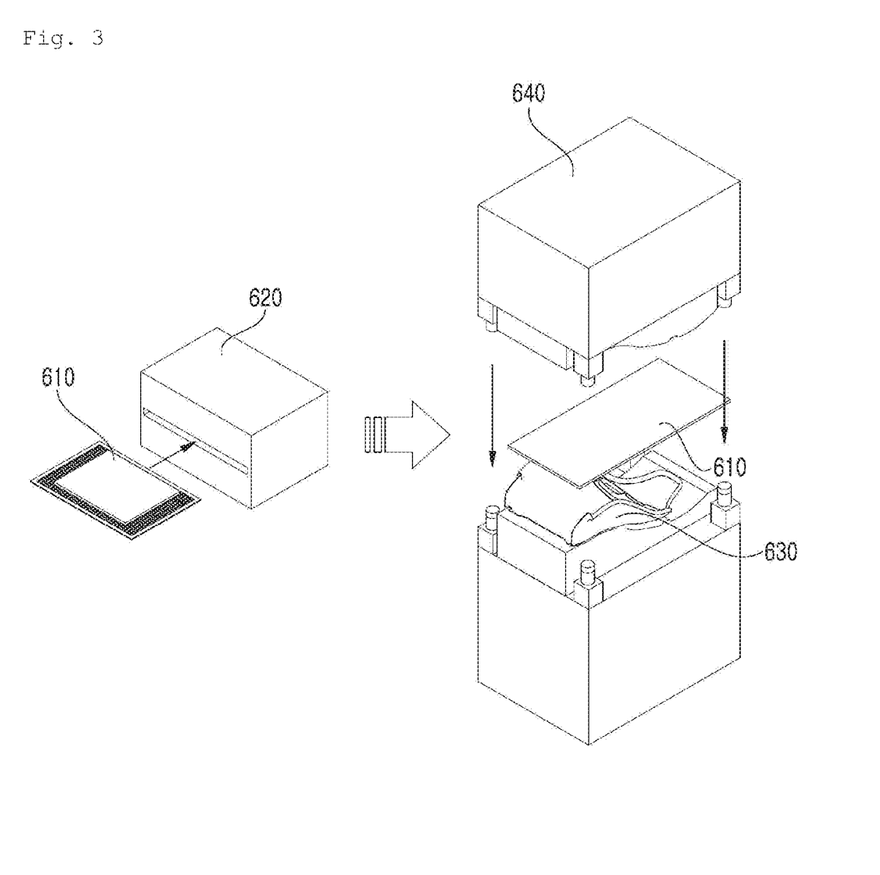
FIGS. 3 to 4 are schematic views showing a method of manufacturing a frame of FIG. 1.
Figure 4:
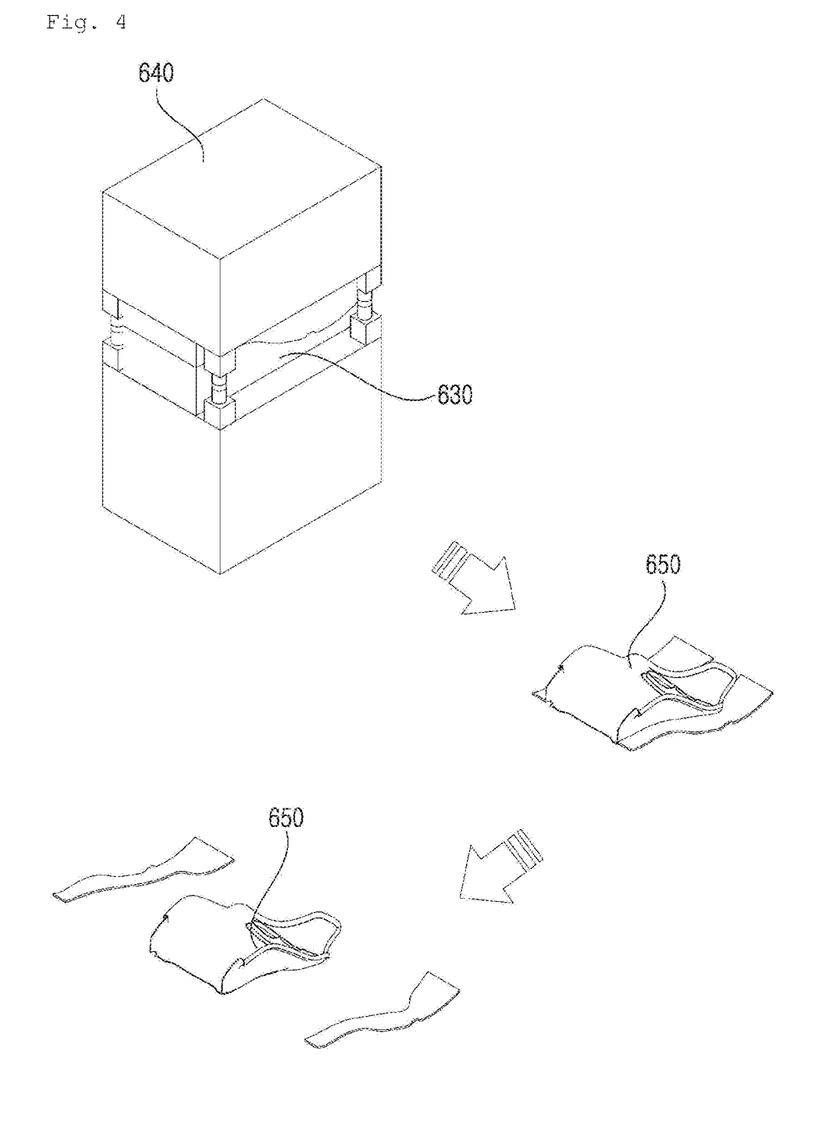
Figure 5:
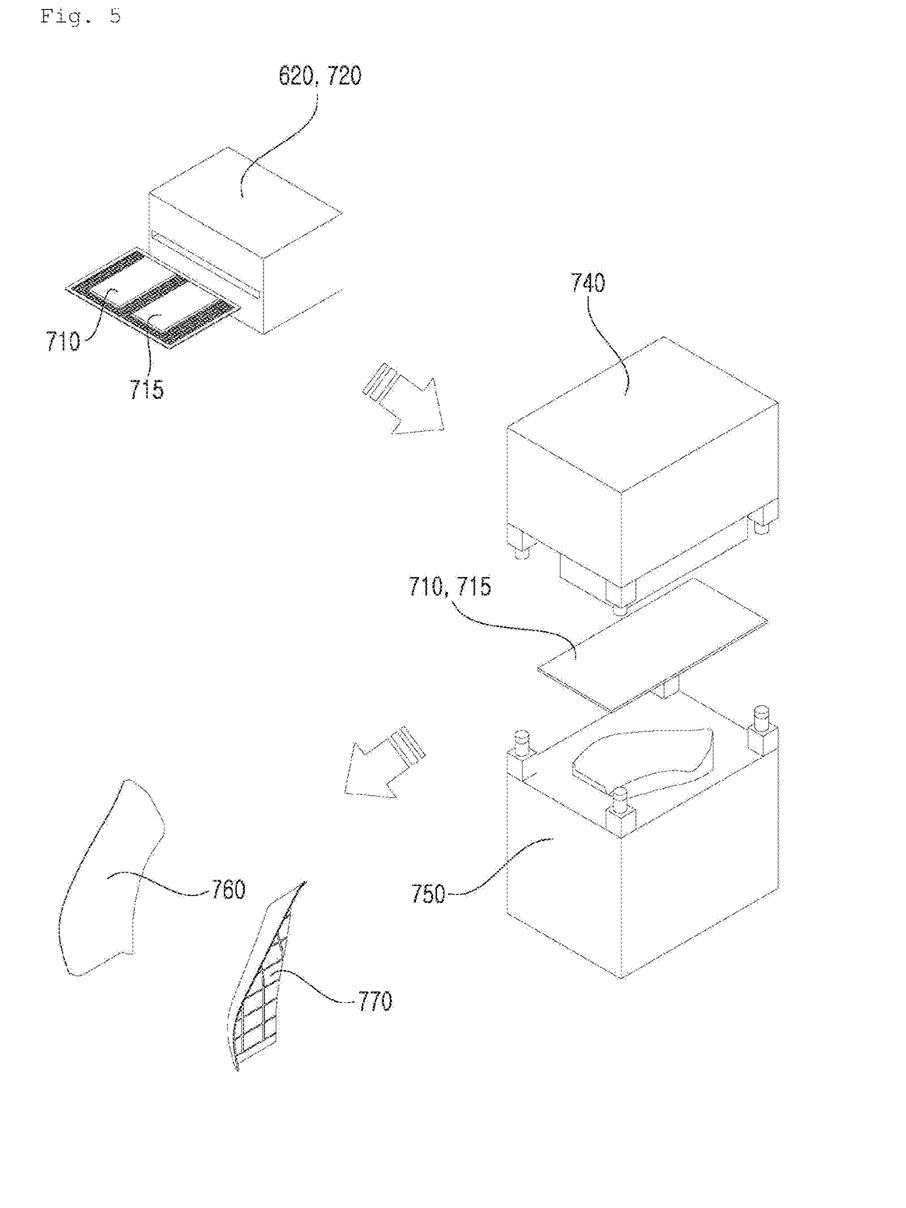
FIGS. 5 and 6 are schematic views showing a method of manufacturing a side member of FIG. 1.
Figure 6:
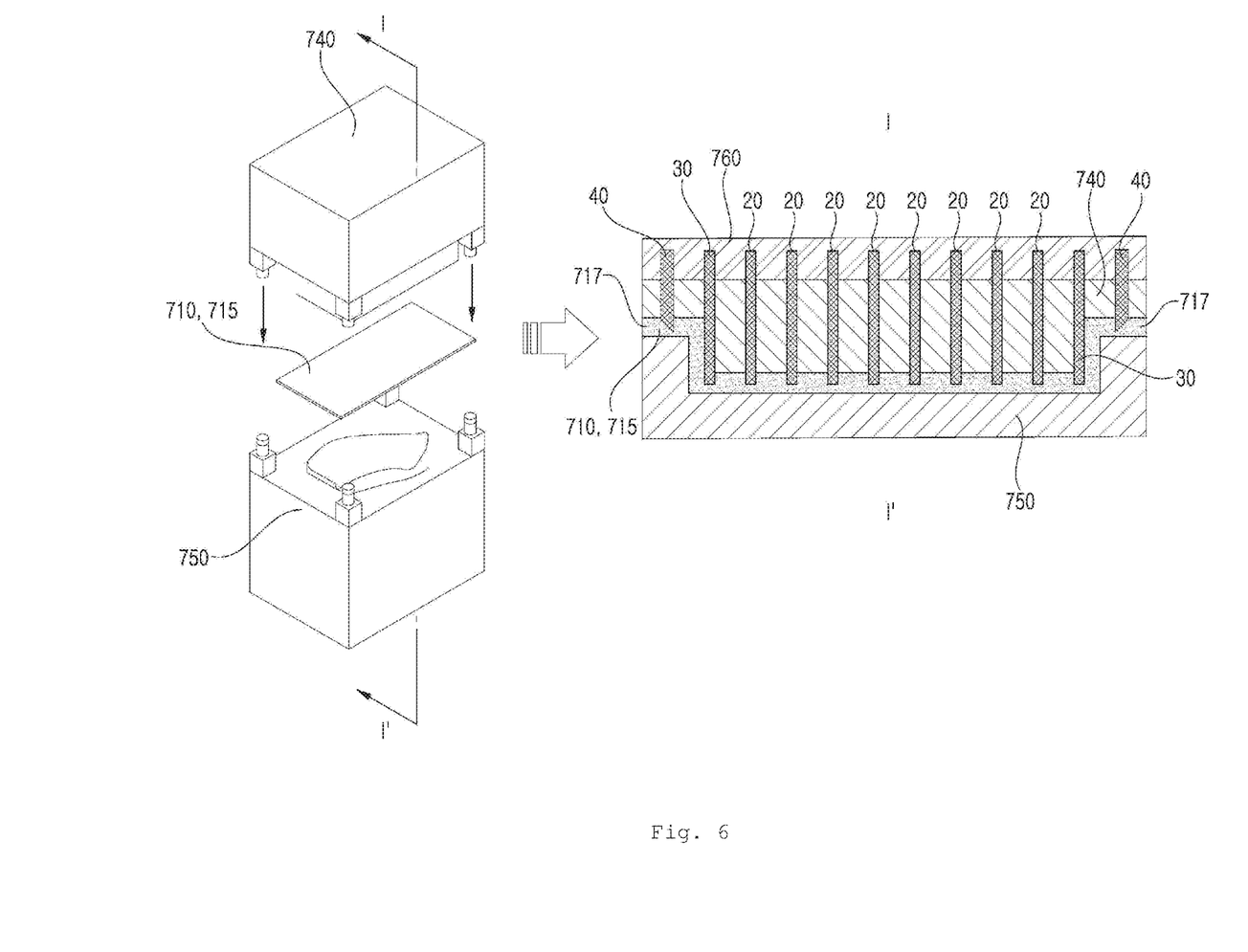
Figure 7:
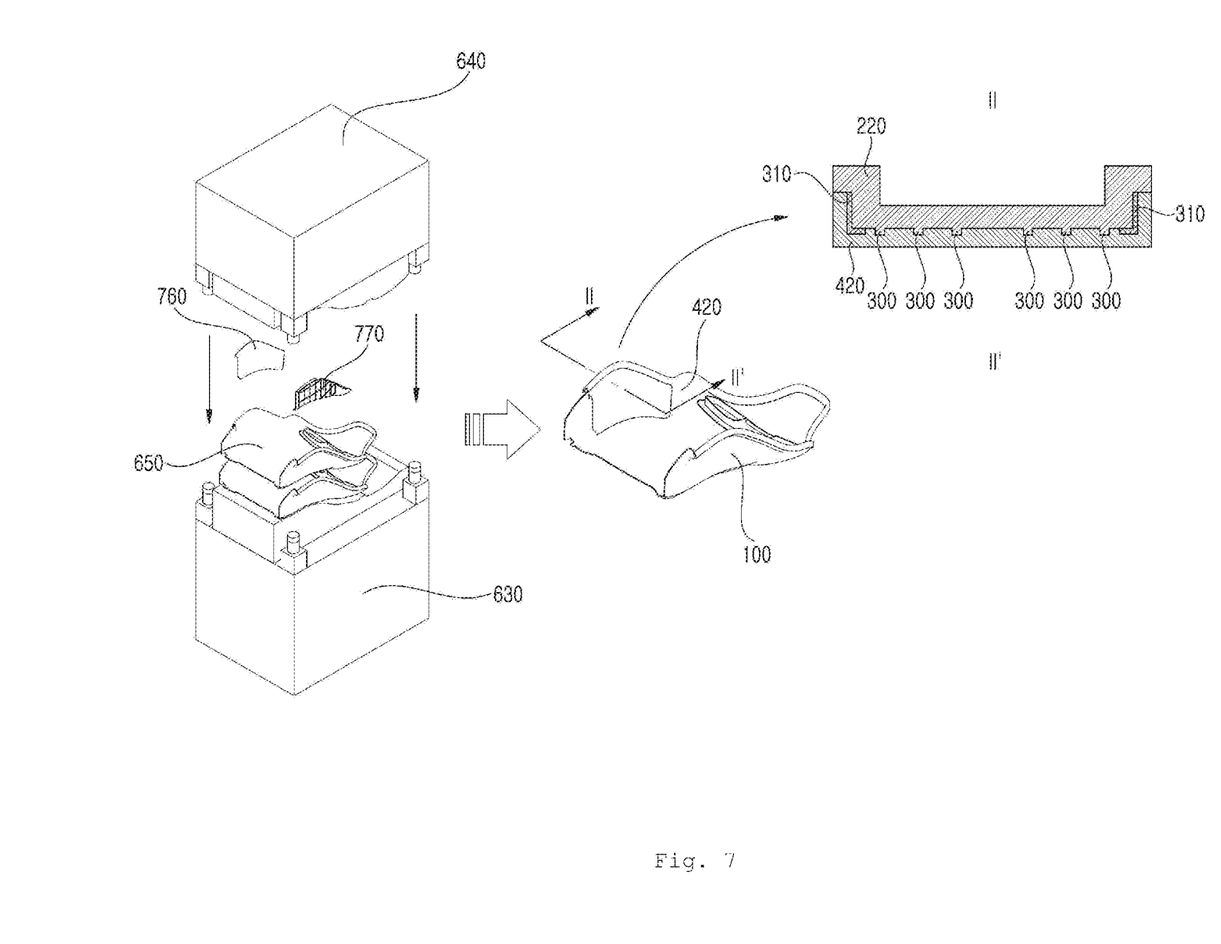
FIG. 7 is a schematic view showing a method of manufacturing the seat frame assembly of FIG. 1 using the frame and the side member manufactured in FIGS. 3 to 6.
Figure 8:
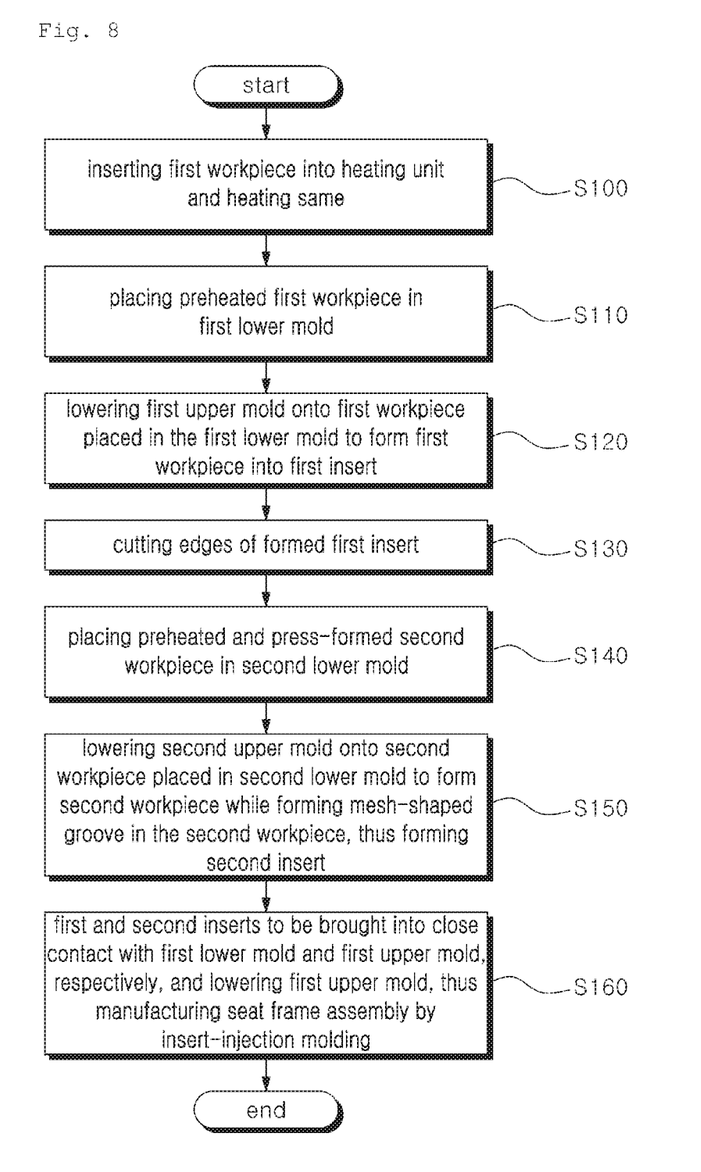
FIG. 8 is a flow chart of the method of manufacturing the seat frame assembly of FIGS. 3 to 7.

FIGS. 3 to 4 are schematic views showing a method of manufacturing a frame of FIG. 1. FIGS. 5 and 6 are schematic views showing a method of manufacturing a side member of FIG. 1. FIG. 7 is a schematic view showing a method of manufacturing the seat frame assembly of FIG. 1 using the frame and the side member manufactured in FIGS. 3 to 6. FIG. 8 is a flow chart of the method of manufacturing the seat frame assembly of FIGS. 3 to 7.

As shown in FIGS. 3 to 8, a method of manufacturing a seat frame assembly 600 is performed as follows: a first workpiece 610 and second workpieces 710 and 715, which are prepregs manufactured in a plate shape using fine fibers and resin, are manufactured by a press forming process; and then the first workpiece 610 and the second workpieces 710 and 7 are joined by an insert-injection molding process.

As shown in FIGS. 4 and 5, the first workpiece 610, which is a plate-shaped prepreg (PA6-GF60%) manufactured by joining resin to a fiber reinforced material including long fiber reinforced thermoplastics (LFT) and short fiber reinforced thermoplastics (SFT), is inserted into a heating unit 620 and undergoes a preheating process at a high temperature of 280° C. for about 2 minutes to transition to a state in which moldability is improved (step S100).

The first workpiece 610 having improved moldability is placed in a first lower mold 630 at a location between a first upper mold 640 and the first lower mold 630. Herein, the first workpiece 610 is brought into close contact with an upper portion of the first lower mold 630 due to a flexible property obtained through preheating (step S110).

In a state in which the first workpiece 610 is placed in close contact with the first lower mold 630, when the first upper mold 640 is lowered, the first workpiece 610 is formed into a first insert 650 for insert-injection molding (step S120).

Burrs generated at the edges of the first insert 650 due to lowering of the first upper mold 640 are removed by a separate cutting process (step S130).

Each of the second workpieces 710 and 715 for forming second inserts 760 and 770 is preheated through the existing heating unit 620 or a separate heating unit 720, and each of the preheated second workpieces 710 and 715 is individually placed in a second lower mold 750 (step S140).

The second workpieces 710 and 715 individually placed in the second lower mold 750 are individually formed into second inserts 760 and 770, respectively, by lowering of a second upper mold 740 and a press forming process (step S150).

The shapes of the second inserts 760 and 770 are the same, respectively, as the shapes of the side members 420 and 440 shown in FIGS. 1 and 2. In the press forming process, the second workpieces 710 and 715 are individually formed into the second inserts 760 and 770, respectively, through multiple forming members 20 and 30 and multiple finishing members 40 formed in the second upper mold 740 (step S150).

Each of the forming members 20 and 30 is formed in a heat fusion pin shape. A first end of each of the forming members 20 and 30 is heat-fused to the second upper mold 740 in a state of penetrating through the second upper mold 740 to protrude downward from a lower side of the second upper mold 740 by a predetermined distance, and a second end is fixed to the second upper mold 740 by a fixing part 760 at an upper side of the second upper mold 740 (step S150).

The distance that each of the forming members 20 and 30 protrudes downward from the lower side of the second upper mold 740 is equal to the depth of each of grooves 10 and 12 shown in FIGS. 1 and 2. Each of the grooves 10 and 12 is formed by the forming members 20 and 30 that press the second workpieces 710 and 715 in the press forming process of the second workpieces 710 and 715 (step S150).

The forming members 30 are formed adjacent to bent portions of the second upper mold 740. The forming members 30 are lowered at positions corresponding to bent portions of each of the second workpieces 710 and 715, to form a portion of each of the grooves 10 and 12 in a line shape in a bent surface of each of the second workpieces 710 and 715 (step S150).

In the press forming process in which the second workpieces 710 and 715 are individually press-formed into the second inserts 760 and 770, respectively, a mesh or grid shaped groove is formed in a rear surface of each of the second inserts 760 and 770, whereby the second workpieces 710 and 715 are individually formed into the side members 420 and 440, respectively, in which the grooves 10 and 12 shown in FIGS. 1 and 2 are formed, respectively (step S150).

In the press forming process in which the second workpieces 710 and 715 are individually press-formed into the second inserts 760 and 770, respectively, each of the finishing members 40 cuts a portion of the edge of each of the second workpieces 710 and 715 to induce the cut portion to be naturally cut in the insert-injection molding process which will be described later (step S150).

A first end of each of the finishing members 40 includes an inclined surface oriented toward outside the second upper mold 740 and is disposed in the same vertical line as a position where a burr 717 at the edge of each of the second workpieces 710 and 715 is generated. The first end of each of the finishing members 40 penetrates through the second upper mold 740 to protrude downward from the lower side of the second upper mold 740 by a predetermined distance equal to the depth of each of the grooves 10 and 12.

A second end of each of the finishing members 40 is fixed at the upper side of the second upper mold 740 by the fixing part 760 in a state of protruding a predetermined distance upward from the upper side of the second upper mold 740.

In a guide groove formed in each of the second workpieces 710 and 715 formed by the first end of each of the finishing members 40, a cut surface located at a position inward of each of the second workpieces 710 and 715 forms a vertical flat surface. In the guide groove, an inclined surface is formed at a portion of each of the second workpieces 710 and 715 located at a position outward of each of the second workpieces 710 and 715.

Thus, through lowering of the second upper mold 740, the first end of each of the finishing members 40 forms the guide groove in a portion corresponding to the boundary between the burr 717 and each of the second inserts 760 and 770 obtained by forming of the second workpieces 710 and 715, to induce the portion to be naturally cut in the insert-injection molding process in which the second inserts 760 and 770 are insert-injection molded together with the first insert 650.

Meanwhile, although not shown in the drawings, the forming members 20 and 30 and the finishing members 40 may be coupled to a lower mold in which the second upper mold 740 is disposed below. In this case, when an upper mold having the same structure as that of the second lower mold 750 is lowered toward the lower mold, the forming members 20 and 30 may form grooves in a rear surface of each of the second workpieces 710 and 715 placed in the lower mold, whereby the second inserts 760 and 770 may be formed.

The second inserts 760 and 770 formed through the step S150 are individually formed into the side members 420 and 440, respectively, through removal of the burrs 717. Each of the second inserts 760 and 770 is brought into close contact with the first upper mold 640, and the first insert 650 is placed in the first lower mold 630 (step S160).

In a state in which each of the second inserts 760 and 770 is in close contact with the first upper mold 640, and the first insert 650 is placed in the first lower mold 630, the insert-injection molding process performed in which the first upper mold 640 is lowered to compress the second inserts 760 and 770 to the first insert 650, thus manufacturing a seat frame assembly 100 (step S160).

In the insert-injection molding process in which the seat frame assembly 100 is manufactured by insert-injection molding, due to the pressure of the first upper mold 640, a portion of the first side frame 220 is inserted into the groove 10 formed in the side member 420 to form a protrusion 300 and is firmly joined to the side member 420 (step S160).

In addition, although not shown in the drawings, in the insert-injection molding process in which the seat frame assembly 100 is manufactured by insert-injection molding, due to the pressure of the first upper mold 640, a portion of the second side frame 240 is inserted into the groove 12 formed in the side member 440 to form a protrusion 320 and is firmly joined to the second side member 440 (step S160).

The protrusion 300 inserted into a bent portion of the side member 420 is formed when the first upper mold 620 is lowered and a portion of the first side frame 220 is inserted into the groove 10 corresponding to the bent portion of the side member 420 (step S160).

While the exemplary embodiments of the invention have been described above, specific structural and functional descriptions of embodiments of the present invention disclosed herein are only for illustrative purposes of the embodiments of the present invention, and the present description is not intended to represent all of the technical spirit of the present invention. On the contrary, various modifications, equivalents, additions and substitutions are possible, without departing from the scope and spirit of the invention. Therefore, the embodiments of the present invention have been described for illustrative purposes, and should not be construed as being restrictive. The scope of the present invention is defined by the accompanying claims rather than the description which is presented above. Accordingly, various alternatives, modifications, equivalents and other embodiments that may be included within the spirit and scope of the present invention as defined by the appended claims.

INDUSTRIAL APPLICABILITY

A seat frame assembly and a method of manufacturing the same according to the present invention are a device mounted in a seat of a vehicle to support an occupant and a method of manufacturing the same, which can find application in household or industrial vehicles.

The invention claimed is:

1. A seat frame assembly, comprising:
   a frame configured such that a portion of each of opposite sides is bent forward, and supporting an upper body of an occupant; and
   side members joined to the opposite sides of the frame, respectively, each of the side members including a groove formed in a surface being in close contact with the frame,
   wherein the groove of each of the side members is formed in such a manner that a workpiece made of a prepreg is preheated and then multiple pins formed on any one of upper and lower molds press the workpiece between the upper and lower molds by lowering of the upper mold,
   wherein a portion of the frame that is surface joined to each of the side members is provided with a protrusion inserted into the groove,
   wherein the protrusion of the frame is formed in insert-injection molding of a workpiece for frame and workpieces for side members, and
   wherein the side members are formed in such a manner that some of the pins cuts a portion of the edge of the workpieces for side members to induce the cut portion to be naturally cut in the insert-injection molding.

2. The seat frame assembly of claim 1, wherein the frame includes depressed portions depressed toward each other at the opposite sides of the frame, bent portions bent toward the opposite sides of the frame at front edges of the depressed portions, and corner portions bent toward each other at rear edges of the depressed portions, wherein
   the protrusion protrudes from surfaces of each of the depressed portions, each of the bent portions, and each of the corner portions in a direction perpendicular thereto in a mesh shape.

3. A method of manufacturing a seat frame assembly including a frame and side members joined to opposite sides of the frame, the method comprising:
   inserting a first workpiece for forming the frame into a heating unit and heating the first workpiece;
   press-forming the preheated first workpiece, thus forming a first insert;
   press-forming second workpieces preheated for forming the side members, thus forming second inserts each of which includes a groove formed in a rear surface thereof; and
   allowing the rear surface of each of the second inserts to be brought into close contact with each of opposite sides of the first insert and then insert-injection molding the first and second inserts by press forming, thus manufacturing the seat frame assembly,
   wherein the groove of each of the second inserts is formed in such a manner that each of the second workpieces disposed between upper and lower molds is pressed by multiple pins formed in any one of the upper and lower molds, thus forming a mesh-shaped groove in the rear surface of the second insert,
   wherein in the insert-injection molding of the first and second inserts, a portion of the first insert is formed to be a protrusion inserted into the groove, and wherein some of the pins cuts a portion of the edge of the second inserts to induce the cut portion to be naturally cut in the insert-injection molding.

* * * * *